United States Patent [19]

Black et al.

[11] Patent Number: 4,624,818
[45] Date of Patent: Nov. 25, 1986

[54] ROTATIONAL MOLDING PROCESS USING ABRASIVE-RESISTANT NYLON COMPOSITION

[75] Inventors: Carlin J. Black, New York, N.Y.; Frederick N. Bauer, Jr., Wayne, N.J.

[73] Assignee: Allied Corporation, Morris Township, Morris County, N.J.

[21] Appl. No.: 361,684

[22] Filed: Mar. 25, 1982

[51] Int. Cl.[4] .............................................. B28B 1/20
[52] U.S. Cl. ................................. 264/255; 264/113; 264/267; 264/308; 264/310; 264/328.18; 264/DIG. 61
[58] Field of Search ............... 264/255, 267, 310, 269, 264/270, DIG. 61, DIG. 57, 311, 2.1, 112, 113, 128, 265, 328.18; 51/308, 298

[56] References Cited

U.S. PATENT DOCUMENTS

| | | | |
|---|---|---|---|
| 2,120,309 | 6/1938 | Carson | 264/270 |
| 3,115,386 | 12/1963 | Zentmyer | 264/261 |
| 3,281,515 | 10/1966 | Schmitz | 264/128 |
| 3,714,312 | 1/1973 | Nitta et al. | 264/113 |
| 3,780,157 | 12/1973 | Hechlhammer | 264/310 |
| 3,795,725 | 3/1974 | Bulin | 264/71 |
| 3,981,955 | 9/1976 | Otani et al. | 264/255 |
| 4,035,547 | 7/1977 | Heller, Jr. et al. | 264/26 |
| 4,042,559 | 8/1977 | Abelson et al. | 51/298 |
| 4,107,254 | 8/1978 | Webster et al. | 264/270 |
| 4,183,883 | 1/1980 | Blair | 264/255 |
| 4,508,675 | 4/1985 | Salatiello et al. | 264/310 |

FOREIGN PATENT DOCUMENTS 1005457  1/1964  United Kingdom ............... 264/310

*Primary Examiner*—Donald Czaja
*Assistant Examiner*—Jennifer Cabaniss
*Attorney, Agent, or Firm*—Richard A. Negin

[57] ABSTRACT

A method of rotationally molding a polymeric article having an abrasion resistant layer. A polymeric outer layer is first formed. Heated abrasive resistant filler, and additional polymer is fed into the mold. The mold continues to rotate until a uniform layer of abrasive resistant filler and polymeric material forms.

14 Claims, No Drawings

ROTATIONAL MOLDING PROCESS USING ABRASIVE-RESISTANT NYLON COMPOSITION

BACKGROUND OF THE INVENTION

This invention is the field of polyamide compositions; more particularly, the invention relates to a polyamide composition for use in rotational molding and a method for the rotational molding of the composition.

Rotational molding, also known as rotomolding, is used in the manufacture of hollow objects from thermoplastics. In the basic process of rotational molding, solid or liquid polymers are placed in a mold. The mold is first heated and then cooled while being rotated about two perpendicular axes simultaneously. Many polymers can be used in the rotational molding process. Popular polymers for this use are polyolefins such as polyethylene. It is also known to use polycarbonates, crosslinkable polyethylene, nylon, and other materials. In selecting the rotational molding grade formulation, care must be taken to assure that there will not be thermal degradation during the heating cycle. A general discussion on rotational molding is given in MODERN PLASTICS ENCYCLOPEDIA 1979–1980, Volume 56, No. 10A, beginning at Page 381.

It is known to use small amounts of conducting fillers in rotationally molded articles. U.S. Pat. No. 3,733,385 discloses that 0.1 to 2% by weight of a conducting filler can be used to make rotationally molded articles.

U.S. Pat. No. 4,042,559 discloses an abrasive resistant coated abrasive pipe lining sheet.

SUMMARY OF THE INVENTION

This invention relates to a method of rotationally molding a polymeric article and the article produced by that method. The method comprises the steps of feeding polymer, preferably in powder or pellet form, to the cavity of rotational mold having an inner mold surface. The mold is heated to at least the melting temperature of the polymer, typically from about 121° C. (250° F.) to about 399° C. (750° F.). The mold is rotated, preferably rotated simultaneously along two perpendicular axes to form an outer polymeric layer contiguous with the inner mold surface. An abrasive resistant filler, preferably alumina, silicon carbide, or a mixture thereof, is heated to from about 121° C. (250° F.) to about 399° C. (750° F.). Heated abrasive resistant filler is fed into the mold. Additional polymer is fed into the mold. The mold continues to rotate, preferably rotating simultaneously along two perpendicular axes to form a second layer of polymer and abrasive filler. The steps of feeding heated abrasive resistant filler and polymer can continually be repeated. Each layer preferably has 40 to 60 percent by weight of the abrasive filler which is preferably in the form of powder, pellets, or beads. The mold is then cooled, and the molded article removed.

In a preferred embodiment of the present invention when the abrasive resistant filler has a particle size larger than about 24 mesh, preferably larger than 12 mesh and up to about 8 mesh, the process comprises adding the heated filler into the mold after the outer layer is formed. The mold is rotated, preferably simultaneously along two perpendicular axes. This is followed by the addition of polymer which preferably has an average diameter not greater than the filler particles, and preferably smaller than 12 mesh. The steps of feeding the heated abrasive resistant filler into the mold followed by feeding additional polymer into the mold can be repeated.

In a preferred embodiment of the present invention when the abrasive resistant filler has a particle size smaller than about 12 mesh, preferably smaller than 24 mesh to about 500 mesh, the process comprises adding the filler and polymer simultaneously, after the outer layer is formed. Preferably, the polymer and the filler are added together, while the mold is rotating. The mold is rotated, preferably simultaneously along two perpendicular axes. The polymer is smaller than about 12 mesh and preferably from 12 to 35 mesh.

The polymer is preferably polyamide, which is preferably heat stabilized polycaprolactam. The preferred abrasive resistant fillers are alumina beads and silicon carbide particles. The mold and the beads are heated to between 260° C. (500° F.) and 316° C. (600° F.).

The present invention includes a hollow article having an outer polymeric layer and at least one inner layer of abrasive resistant filler and polymer integrally fused to the outer layer.

DESCRIPTION OF THE PREFERRED EMBODIMENTS

The present invention is a method of rotationally molding a polymer article having an abrasive resistant layer.

In the method of the present invention a polymer article is rotationally molded in a rotational mold of the type known in the art. The mold can be rotated. Preferably, the mold can be rotated simultaneously about two perpendicular axes. This is preferred since it results in a uniform molded wall thickness in three dimensions, and because commercially available rotational molding machines rotate the mold simultaneously about two perpendicular axes. The polymer is fed to the cavity of the rotational mold. The rotational mold has an inner surface which will define the shape of the outer surface of the molded article. The polymer is fed into the cavity of the rotational mold. The mold is heated to at least the melting temperature of the polymer, typically from about 121° C. (250° F.) to about 399° C. (750° F.). The mold is rotated, preferably simultaneously along two perpendicular axes. The polymer within the mold melts and forms an outer layer of polymer contiguous with the inner mold surface. An abrasive resistant filler which is heated to at least the melting temperature of the polymer, typically 121° C. (250° F.) to 399° C. (750° F.), and preferably from about 260° C. (500° F.) to about 399° C. (750° F.) is fed into the mold. Additional polymer is fed into the mold. The mold is rotated, preferably simultaneously along two perpendicular axes to form a uniform layer of abrasive resistant filler and polymer on the inner surface of the outer layer. After the layer of polymer and abrasive resistant filler has been formed the steps of adding additional layers of polymer and abrasive filler can be repeated varying the proportions of polymer and filler and increasing the thickness of the article being molded.

The steps of adding abrasive resistant filler and polymer, on the inside of the outer layer can be repeated. Each subsequent addition can be used to form a new layer. The composition of each layer can be varied. Polymer type, filler type, particle size of the polymer and filler, and relative proportion of polymer and filler can be varied.

In a preferred embodiment of the present invention when the abrasive resistant filler has a particle size larger than about 24 mesh, preferably larger than 12 mesh and up to about 8 mesh, the process comprises adding the heated filler into the mold after the outer layer is added. The mold is rotated, preferably simultaneously along two perpendicular axes. This is followed by the addition of polymer which preferably has an average diameter not greater than the filler particles, and preferably smaller than 12 mesh.

In this embodiment which relates to the use of larger particle size abrasive resistant particles, the particles alone are fed into the mold after the outer layer is formed. The rotation of the mold can be stopped and the particles fed into the mold. Preferably, the particles of a filler are fed into the mold as it rotates. The particles adhere to the inner surface of the molten outer layer. After the particles have been fed in and when most of them are adhering to the inner surface of the outer layer the polymer particles are fed in. The mold can be stopped before the polymer particles are fed. Preferably, the mold continues to rotate as the polymer particles are fed in. The polymer particles adhere to the inner layer, and melt and flow between the abrasive resistant particles. The polymer particles are preferably smaller than the particles of abrasive resistant material so that they can readily fit between abrasive resistant particles to form a uniform layer of polymer and filler.

In a preferred embodiment of the present invention when the abrasive resistant filler has a particle size smaller than about 12 mesh, preferably smaller than 12 mesh to about 500, the process comprises adding the heated filler and polymer simultaneously, after the outer layer is added. Preferably, the polymer and the filler are added together, while the mold is rotating. The mold is rotated preferably simultaneously along two perpendicular axes. The polymer is smaller than about 12 mesh and preferably from 12 to 35 mesh.

In this embodiment which relates to the use of smaller particle size abrasive resistant particles, the rotation can be stopped but is preferably continued after the outer layer is formed. If the mold is stopped the polymer particles are fed in and the small particle abrasive resistant filler material is fed on top of the polymer particles. The rotation of the mold then continues. The polymer particles begin to melt, coating the filler particles. The polymer and filler which have been coated form a uniform layer on the inner surface of the outer layer. Alternately, and preferably the polymer particles and abrasion resistant filler particles are added together as the mold rotates. The polymer and filler particles form a uniform layer in the inner surface of the outer layer.

When smaller abrasive resistant material is used, having an average diameter of from 500 mesh to 12 mesh, the polymer particle size is preferably no larger than 12 mesh. The abrasive resistant particles and the polymer particles can then be uniformly intermixed and form a uniform layer.

When the embodiment of the present invention where the layer containing abrasive resistant filler and polymer is made by adding the heated filler and polymer together, without a separate rotation period between addition of filler and particles, the outer layer is optional. However, the outer layer is preferred since it provides desired physical properties to the article, particularly toughness.

The heating of the abrasive resistant filler is important both when the particles are large or small. When the particles are large and heated they adhere more easily to the inner surface of the outer layer. They do not tend to float to the surface of the polymer added to form the layer of filler and polymer. When the heated filler particles are small they can be added together with the polymer. The polymer and filler particles form a uniform layer. In the past attempts to mix particles and polymer together without preheating the particles resulted in the filler particles floating to the surface of the polymer added to form the composite layer.

The process of the present invention results in a composite having a layer of polymer and abrasive resistant filler in which there are a minimum of voids. Void formation during processing is undesirable because it results in abrasive resistant particles from the abrasive resistant layer being more easily removed. The removed abrasion resistant particles then act as an abrasive within the article.

The process of the present invention can be conducted in most commercial rotational molding machines. The temperature during heating is at least the melting temperature of the polymer. The temperatures range during the heating step from about 121° C. (250° F.) to about 399° C. (750° F.), and preferably from about 302° C. (575° F.) to about 352° C. (675° F.). If the temperature is too high during rotational molding, the impact properties deteriorate. The temperature must be high enough for the pellets to fuse together to form a smooth inner surface of the molded article. The mold is heated by suitable means known in the art. Generally, the mold rotates within a forced air circulating oven.

After the heating step the mold is cooled. The part must be cool enough to be easily removed from the mold and retain its shape. Preferably, the mold continues to rotate when it is removed from the oven. Cool air is first blown on the mold. The air can be at ambient temperature. After the air has started to cool the mold for a controlled time period, a water spray can be used. The water cools the mold more rapidly. The water used can be at cold water tap temperature, usually from about 4° C. (40° F.) to about 16° C. (60° F.). After the water cooling step, another air cooling step may optionally be used. This is usually a short step during which the equipment dries with heat removed during the evaporation of the water.

The heating and cooling cycle times for each layer will depend on the equipment used and the article molded. Specific factors include the part thickness, mold material and polymer type. Typical conditions for a ⅛ inch (0.32 cm) thick outer layer of polycaprolactam in a steel mold are to heat the part in an oven with air at about 343° C. (650° F.) for about 19 minutes. Inner layers are then applied. The part is cooled in ambient temperature forced air for at least about 5 minutes and then in a tap water spray at about 10° C. (50° F.) for at least about 5 minutes. Optionally, the part is cooled in ambient temperature forced air for an additional 2 minutes.

During the heating and cooling steps, the mold containing the molded article is continually rotated preferably along two perpendicular axes. The rate of rotation of the mold about each axis is limited by machine capability and the shape of the article being molded. A typical range of operation which can be used with the present invention is to have a ratio of rotation of the major axis to the minor axis of from 1:8 to 10:1, and preferably from 2:1 to 8:1 being preferred.

Preferably, the rotational molding is conducted under an inert atmosphere within the mold. When it is desired to use an inert atmosphere, the mold cavity can be purged with nitrogen. Most rotational molding machines have arms which are drilled for gas injection, so that all that is necessary is to connect a nitrogen gas cylinder to the arm, using the rotary valves in the connection. Alternatively, dry ice can be added to the mold cavity at the time the resin is charged to the mold. The dry ice will sublime during the heating cycle and provide an inert atmosphere.

The mold surface can be sprayed or coated with a mold release coating. A preferred mold release agent is a baked-on silicon based mold release coating, such as Freekote ® coating. This coating is baked for 15–20 minutes at about 282° C. (450° F.) to 343° C. (550° F.). The mold is cooled and sanded on the inside. The sanded surface allows the composition to maintain contact during molding and not release to readily and warp while being cooled. Yet upon cooling, the molded article easily releases. A vent can be used to avoid pressure buildup on the inside of the mold during the heating step.

In summary, the mold is charged with a preweighed amount of the polymer. The mold is closed and clamped securely to be sure that there is an adequate mating of the mold at the parting line. Preferably, an inert gas such as nitrogen is fed into the mold. The mold rotates as the molding begins and continues through the heating and cooling steps. Filler and additional polyamide are alternately added.

During the molding process, the composition is heated to above the melting point of the polymer, typically from 121° C. (250° F.) to about 399° C. (750° F.), and preferably from 288° C. (550° F.) to 352° C. (675° F.). If the temperature is too high optimum molding properties are not attained.

The present invention includes a hollow article having an outer polymer layer containing no abrasive filler and at least one inner layer of abrasive filler and polyamide integrally fused to the outer layer. The process of the present invention is the preferred method to use to make the hollow article. The hollow article can have a variety of layers including different fillers and different proportions of filler and polyamide in each layer. During the rotational molding process the abrasive filler and polymer in each layer are homogeneously mixed, however, there is little migration of the filler from one layer to adjoining layers.

The outer layer can be from 1/16 inch (0.16 cm) to ½ inch (1.27 cm), and preferably ⅛ inch (0.32 cm) to ¼ inch (0.64 cm) thick. Each layer containing polymer and abrasive resistant filler material can be from 1/16 inch (0.16 cm) to 1 inch (2.54 cm) and preferably from ⅛ inch (0.32 cm) to ½ inch (0.64 cm) thick. Useful articles which can be made include abrasive resistant pipe and cyclone separators.

Polymers which are useful in the present invention include but are not limited to: polyamides; polyolefins, such as polyethylene, polypropylene, and crosslinkable polyethylene; polycarbonates; and fluoropolymers, such as chlorotrifluoroethylene, and the copolymer of ethylene and chlorotrifluoroethylene; polyvinyl chloride, polyacetals; and polyurethane. The outer layer and the layers containing abrasion resistant particles can be made of the same or different polymer materials as long as there is sufficient adhesion. For example, the outer layer can be made of a polyamide and the polymer of the inner layer of abrasion resistant particles and polymer can be made of ethylene chlorotrifluoroethylene.

In an additional embodiment the outer layer can be made of one or more layers of the same or different polymers. The inner surface of the outer layer can be coated with a barrier layer to prevent gases from diffusing across the article wall. Example barrier layers include but are not limited to: ethylene copolymers such as ethylene vinyl acetate, ethylene acrylic acid, or ethylene ethyl acrylate.

A preferred polymer useful in the present invention is a polyamide. Polyamide is preferred because it resists direct impact of the abrasive materials very well. The term "polyamide" used in the practice of the present invention is intended to include long chain synthetic polymers which have regularly recurring amide groups as an integral part of the main polymer chain; and hence, include amide-ester copolymers. Suitable polyamides can be prepared by polymerization of a difunctional monomer or equivalently, its cyclized lactam (e.g., epsilon-aminocaproic acid or caprolactam, respectively) or by the reaction of a conjugate pair of monomers, for example, a diamide and a dicarboxylic acid (e.g., hexamethylenediamine and adipic acid), or a linear aminoaliphatic acid such as 12-amino undecanoic acid.

Suitable polylactams can be produced by the polymerization of lactam monomers of the formula

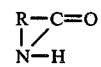

where R is an alkylene group having from 3 to 12 or more carbon atoms, preferably from 5 to 12 carbon atoms. A preferred monomer is epsiloncaprolactam having 5 carbon atoms in the alkylene group. Lactam monomers in addition to epsiloncaprolactam include pyrollidone, piperodone, valerolactam, caprylactam, lauryl lactam, etc. Also included are copolymers of two or more of the above or similar lactam monomers. Suitable diamines useful in the polymerization of polyamides include propanediamine, hexamethylenediamine, octamethylenediamine, etc. Suitable polycarboxylic acids include acids such as adipic acid, pimelic, suberic, sebacic, dodecaneoic, etc. Also included are copolymers or blends of polyamides of the above categories.

Typically, the number average molecular weight of these polymers is between about 10,000 and about 50,000, preferably 15,000 to 40,000 and more preferably 20,000 to 30,000. This is because mechanical properties improve rapidly until about 20,000, and processing starts to become more difficult above 30,000.

Polyepsiloncaprolactam is the preferred polyamide for use in the present invention. U.S. Pat. No. 4,508,675 describing a preferred composition and process for rotationally molding polyamide is hereby incorporated by reference. Polyepsiloncaprolactam suitable for use herein can contain a variety of terminal functionality. Preferred terminal functionality is that containing:

(a) A carboxyl group attached to both ends of the polyamide chain;

(b) A carboxyl group attached to one end and an acetamide group attached to the other end of the polyamide chain;

(c) An amine group attached to both ends of the polyamide chain; and (d) A carboxyl group attached to one end and an amino group attached to the other end of the polyamide chain.

It is preferred that the polyepsiloncaprolactam have more chain ends terminated by acid groups than by amine groups. When this is the case, the composition can be rotationally molded in the presence of oxygen. However, it is preferred to use an inert, oxygen-free atmosphere, such as nitrogen or carbon dioxide, to prevent oxidation even where there is excess end groups terminated with carboxyl groups. If there are not more polyepsiloncaprolactam chain ends terminated with acid groups than with amine groups, an inert atmosphere is required for a satisfactory product with the polyepsiloncaprolactam stabilized by a stabilizer such as copper based compound, preferably cuprous iodide.

Polyamides other than polyepsiloncaprolactam can be used, but polyepsiloncaprolactam is preferred. For example, polyhexamethylene adipamide has a higher melting temperature and flows with more difficulty than polyepsiloncaprolactam. The polyepsiloncaprolactam provides a lower melting, easier processing product wherein the pellets of material flow or knit more readily into each other.

The polyepsiloncaprolactam composition of this invention does not require the use of a plasticizer for successful rotational molding, although caprolactam can be used as a plasticizer.

The polymer is fed into the mold in powder or pellet form. If the polymer is a polyamide such as polycaprolactam and the particles are too small, the surface area is so large that exposure to the atmosphere results in excessive moisture pickup. For example, a 35 mesh (400 micrometer) size polycaprolactam powder exposed to the atmosphere is unsatisfactory unless it is kept dry. It is preferred to use powder having a particle size greater than 35 mesh (400 micrometer) preferably from 12 mesh (1 mm) up to pellets 1/32 inch (0.08 cm) in average diameter. The larger size powder or pellets are not as sensitive to moisture pickup. If the polyepsiloncaprolactam particles are too large, it takes a longer time for them to melt and thinner parts cannot be made. Pellets are preferably smaller than about 1/32 inch (0.08 cm) by 1/32 inch (0.08 cm) (or about 1/32 inch (0.08 cm) average diameter), but pellets up to to about ⅛ (0.32 cm) by ⅛ inch (0.32 cm) (or about ⅛ inch (0.32 cm) average diameter) can be used. A preferred pellet shape is a cylindrical pellet which is about 1/32 (0.08 cm) to 1/16 inch (0.16 cm) in diameter, and 1/32 (0.08 cm) to 1/16 inch (0.16 cm) long.

The abrasion resistant particles for use in the present invention are preferably selected from the refractory metal borides, carbides, nitrides, oxides, and mixtures. For example, suitable materials include borides of aluminum, niobium silicon, tantalum, titanium, tungsten and zirconium; carbides of boron, niobium, silicon, tantalum, titanium, tungsten and zirconium; nitrides of aluminum, boron, niobium, silicon, titalum, titanium, tungsten and zirconium; and oxides of aluminum, niobium, silicon, tantalum, titanium, tungsten and zirconium. Other materials which can be utilized include the abrasion resistant minerals, such as granite. The preferred abrasive resistant materials include aluminum and silicon carbide. More exotic materials such as diamond particles can also be used.

The abrasion resistant particles can be coated with coupling agents to improve adhesion to the polymer. Coupling agents which can be used to coat the abrasive resistant particles include gamma-amino propyl triethoxysilane; gamma-glycidyl propyl trimethoxysilane; and N-beta-(aminoethyl)-gamma-amino propyl trimethoxysilane.

Several examples are set forth below to illustrate the nature of the invention and the manner of carrying it out. However, the invention should not be considered as being limited to the details thereof.

In the following Examples a McNeil-Akron Model No. 500/48 Laboratory Rotational Molding Machine was used. This machine has a 500 pound capacity and a 48 inch swing envelope. This mold causes rotation simultaneously about two perpendicular axes, a major axis and a minor axis. The moldings made were cylindrical buckets, 1 10½ inch outside diameter and 10 inches long. The base of the bucket was dome shaped. The mold was made of stainless steel. The end of the mold opposite the dome was insulated with ⅛ inch (0.32 cm) aluminum covered with one inch (2.54 cm) of Marinite insulation. This insulated side or "head" contained a 4 inch diameter hole which was closed with a glass filled tetrafluoroethylene plug machined to fit the hole. This plug was equipped with a gas inlet port and a vent port. This plug was held in place by a quick release lever clamp to permit quick removal while the mold was hot.

In all of the Examples the polymer used was polyepsiloncaprolactam having more chain ends terminated with azelaic acid than amine groups. The polyepsiloncaprolactam has about 45 milli equivalent (m.eq.) of carboxyl and about 20 m.eq. amine terminated end groups per kilogram (kg) of polyepsiloncaprolactam. The polyepsiloncaprolactam has an estimated formic acid relative viscosity of from about 65 to about 80. The polyepsiloncaprolactam was washed in water to remove unreacted caprolactam monomer. About 1.5 percent caprolactam remains. The polyepsiloncaprolactam contained about 0.02 weight percent by weight of cuprous iodine.

In each of the Examples the following process was generally followed with specific details and variations noted with each Example.

The mold was charged with ⅛ inch (0.32 cm) long by 1/16 inch (0.16 cm) diameter cylindrical polymer pellets and closed. Nitrogen (1–2 psig at cylinder) was introduced to displace air in the mold and a slow purge maintained throughout the cycle. The vent was open to the atmosphere and plugged loosely with glass wool to prevent molding powder from escaping.

The mold was indexed into the heated oven set at the desired temerature and rotated biaxially for a given amount of time at a given major to minor axis of rotation ratio and with rotation rate of the major axis. The minor axis coincided with the longitudinal axis of the bucket. At the end of the first heat cycle the mold was indexed back out to work area. Rotation was stopped and abrasive resistant compositions introduced. The mold was indexed back into the oven, for the required time. The mold was then indexed into the cooling station and cooled for a given time in air, and a given time in a water spray, and final period in air while being rotated biaxially. The part was removed by removing entire insulated head and sliding part out.

EXAMPLE 1

An abrasion resistant article was made from the polymer and 8-12 mesh alumina beads produced by Ferro Corp.

Three pounds of polymer pellets were fed into the mold. The mold was purged with nitrogen and a nitrogen atmosphere maintained. The mold was rotated at 15 revolutions per minute along the major axis with the ratio of rotation between the major and minor axis being 4:1. The mold was indexed into the oven which was set at 650° F. (343° C.) and heated for 22 minutes. This formed the outer layer.

The mold was indexed out of the oven. One and a quarter pounds (0.568 kg) of 8-12 mesh alumina beads preheated for 15 minutes at 650° F. (343° C.) were added and the mold was rotated while out of the oven for 4 minutes. At this time one pound of 12 mesh powdered polymer was added and the mold indexed back to the oven where it continued to rotate at the same speed for 10 minutes. The addition of alumina and powdered polymer was repeated.

The mold was then indexed out of the oven while rotating and cooled by blowing air at ambient temperature on it for 10 minutes, a spray of tap temperature cold water for 15 minutes, and finally air for 2 minutes.

The rotationally molded bucket released from the mold and had good appearance. The composite layer of polymer and abrasive resistant particles was uniform. It was observed that more abrasive pellets could be added.

In this and the following laboratory embodiments, the mold had to be removed from the oven and rotation stopped to add abrasive resistant material and polymer. In a larger and/or production operation it is recognized that the filler and additional polymer can be added in the oven. One way to accomplish this is to attach hoppers to the mold, directly or indirectly. A hopper for the filler could be opened to the oven atmosphere so that the filler could be preheated. The hopper for the polymer could be insulated so as not to melt the polymer. In this way the mold does not have to be removed from the oven and opened each time additional material is added.

COMPARATIVE 1

An abrasive resistant article was attempted to be made from the polymer and alumina beads of the type used in Example 1.

Three pounds of polymer pellets were fed into the mold. The mold was purged with nitrogen and a nitrogen atmosphere maintained. The mold was rotated at 15 revolutions per minute along the major axis with a ratio of rotation between the major and minor axis being 4:1. The mold was indexed into the oven which was set for 650° F. (343° C.) and heated for 19 minutes. This formed the outer layer.

The mold was indexed out of the oven. Two pounds (0.908 kg) of 8-12 mesh alumina beads of the type described in Example 1 which were not preheated together with 3 pounds (1.362 Kg) of 12 mesh polymer powder. The mold was indexed back to the oven where it continued to rotate at the same speed for 25 minutes.

The mold was then indexed out of the oven and cooled under the same conditions as in Example 1. The beads agglomerated and fell to the bottom with few embedding in a separate inner layer of polymer and filler.

EXAMPLE 2

Example 1 was repeated except that 2 pounds (0.908 kg) of alumina were added at the first addition and the mold was rotated in the oven for 15 minutes after the addition of powdered polymer. Two pounds (0.908 kg) of beads were found to be more than necessary. Loose beads remained in the mold cavity after the inside of the outer layer was coated. The second addition of alumina beads was reduced to 1.6 pounds (0.726 kg) which was satisfactory.

EXAMPLE 3

An abrasive resistant article was made from the polymer and small silicon carbide particles. The silicon carbide was produced by Carborundum Corp. as grade 24 RA (24 mesh).

Three pounds (1.362 kg) of polymer pellets were fed into the mold. The mold was purged with nitrogen and a nitrogen atmosphere maintained. The mold was rotated at 20 revolutions per minute along the major axis with a ratio of rotation between the major and minor axis being 4:1. The mold was indexed into the oven which was set for 650° F. (343° C.) and heated for 19 minutes. This formed the outer layer.

The mold was rotated out of the oven. Three pounds (1.362 kg) of 12 mesh powdered polymer was added to the mold. One and one half pounds (0.681 kg) of the silcon carbide preheated to 650° F. (343° C.) was added immediately on top of the nylon. The mold was rotated at the same conditions and indexed back into the oven where it rotated for 25 minutes.

The mold was then indexed out of the oven while rotating and cooled under the same conditions as in Example 1.

The rotationally molded bucket easily released from the mold. The bucket had a polymeric outer layer and uniform inner layer of small silicon carbide and polymer.

EXAMPLE 4

Example 3 was repeated using Carborundum Corp. grade 46 RA (46 mesh) silicon carbide as an abrasive resistant filler. The result was equally satisfactory.

EXAMPLE 5

Example 3 was repeated using Carborundum Corp. grade 90 RA (90 mesh) silicon carbide as an abrasive resistant filler. The result was equally satisfactory.

EXAMPLE 6

Example 3 was repeated using Ferro Corp. grade 60-90 (60-90 mesh) silicon carbide as an abrasive resistant filler. The result was equally satisfactory.

EXAMPLE 7

Example 6 was repeated using one pound (0.454 kg) of Carborundum Corp. 90 BT (90 mesh) alumina in place of the 1½ pounds (0.681 kg) Ferro 60-90 silicon carbide. The bucket easily released from the mold and had a polymer outer layer and a uniform inner layer of polymer and alumina.

EXAMPLE 8

Repeat Example 1 with the filler coated with gamma-amino propyl triethoxysilane.

While exemplary embodiments of the invention have been described, the true scope of the invention is to be determined from the following claims.

What is claimed is:

1. A method of rotationally molding an article in a rotational mold having a mold cavity and an inner mold surface comprising the steps of:
   feeding the polymer to the cavity;
   heating the mold to at least the melting temperature of the polymer;

rotating the mold to form an outer layer of polymer on the inner mold surface, the outer layer of polymer having an inner surface;

heating an abrasive resistant filler to at least the melting temperature of the polymer;

feeding the abrasive resistant filler into the mold cavity;

feeding additional polymer into the mold;

rotating the mold to form a uniform layer of polymer and filler on the inner surface of the outer layer of polymer;

cooling the mold; and removing the article.

2. The method as recited in claim 1 further comprising the step of rotating the mold between the steps of feeding heated abrasive filler into the mold and feeding additional polymer into the mold.

3. The method as recited in claim 1 wherein the heated abrasive resistant filler and polymer are added together.

4. The method as recited in claims 1, 2 or 3 wherein the steps of feeding heated abrasive resistant filler and additional polymer into the mold can be repeated as many times as necessary to achieve a desired thickness and composition distribution.

5. the method as recited in claim 2 wherein the heated abrasive resistant filler has a large particle size of from 24 to 8 mesh, the large particles adhering to the inner surface prior to feeding additional polymer to the mold.

6. The method as recited in claim 3 wherein the heated abrasive resistant filler has a small particle size of from 500 to 12 mesh, the small particles and additional polymer forming a uniform layer on the inner surface.

7. The method as recited in claim 1 wherein the polymer is selected from the group consisting of polyamides, polyolefins, fluoropolymers, polyacetates, and polyurethanes.

8. A method of rotationally molding a polyamide article in a rotational mold having a mold cavity and an inner mold surface, comprising the steps of:

feeding polyamide to the cavity;

heating the mold to from about 260° C. (500° F.) to about 399° C. (750° F.);

rotating the mold to form an outer layer of polyamide contiguous with the inner mold surface, the outer layer of polyamide having an inner surface;

heating an abrasive resistant filler to from about 260° C. (500° F.) to about 399° C. (750° F.);

feeding heated abrasive resistant filler into the mold;

feeding additional polyamide into the mold;

rotating mold to form a second layer of polyamide;

cooling the mold; and removing the article.

9. The method as recited in claim 8 wherein the polyamide is polyepsiloncaprolactam.

10. The method as recited in claim 9 wherein the polyepsiloncaprolactam contains from about 8 percent to about 12 percent by weight of caprolactam monomer.

11. The method as recited in claim 9 wherein the polyamide is of a particle size greater than 35 mesh.

12. The method as recited in claim 9 wherein the polyamide is from about 15 mesh up to pellets which are about ⅛ inch (0.32 cm) in average diameter.

13. The method as recited in claim 8 wherein the mold is heated to from about 260° C. (500° F.) to about 316° C. (600° F.).

14. The method as recited in claims 1 or 8 where the abrasive filler is selected from the class consisting of granite, diamond dust, metal compounds having cations selected from the class consisting of aluminum, niobium, silicon, tantalum, titanium, tungsten, and zirconium, and having anions selected from the class consisting of borides, carbides, nitrides, and oxides.

* * * * *